United States Patent [19]

Green et al.

[11] 4,287,906

[45] Sep. 8, 1981

[54] CONTROL VALVE

[75] Inventors: Charles J. Green, Vashon; Alan K. Forsythe, Burton, both of Wash.

[73] Assignee: Sprague Devices, Inc., Michigan City, Ind.

[21] Appl. No.: 128,731

[22] Filed: Mar. 10, 1980

[51] Int. Cl.³ .......................................... G05D 11/00
[52] U.S. Cl. ............................. 137/118; 137/625.69; 137/505.13; 137/505.14; 137/495; 91/7
[58] Field of Search ................ 91/7, 219; 137/505.13, 137/505.14, 625.48, 625.69, 118, 116.3, 495

[56] References Cited

U.S. PATENT DOCUMENTS

| | | | |
|---|---|---|---|
| 2,616,400 | 11/1952 | Sprague et al. | 91/7 |
| 2,627,251 | 2/1953 | Sprague et al. | 91/7 |
| 2,674,233 | 4/1954 | Sprague et al. | 91/7 |
| 2,678,029 | 5/1954 | Sprague et al. | 91/279 |
| 2,778,345 | 1/1957 | Dolza et al. | 91/7 |
| 2,784,700 | 3/1957 | Griffith | 91/7 |
| 3,005,445 | 10/1961 | Riester et al. | 91/7 |
| 3,128,594 | 4/1964 | Schmitz | 91/7 |
| 3,257,910 | 6/1966 | Gates | 91/7 |
| 3,376,793 | 4/1968 | Papadia et al. | 137/505.13 |
| 3,428,994 | 2/1969 | Bitzer et al. | 91/219 |
| 3,529,512 | 9/1970 | Jones, Jr. | 91/219 |
| 3,661,182 | 5/1972 | Loveless | 137/625.48 |
| 3,948,419 | 4/1976 | Polster | 137/505.13 |

OTHER PUBLICATIONS

1973 Service Manual, GMC Trucks Series 70 Through 9502, Published 1973, by GMC, pp. 1A-50-52.

Primary Examiner—Martin P. Schwadron
Assistant Examiner—H. Jay Spiegel
Attorney, Agent, or Firm—Oltsch, Knoblock & Hall

[57] ABSTRACT

A multi-function valve device for controlling the operation of a pneumatically-driven motor. A spring-biased linkage couples a cam-operated push pin to a valve spool assembly. The valve spool assembly coaxially combines the movable elements of a pressure regulator valve, a run valve, and a park valve into a single unit slidable axially within the valve housing and positioned by the spring-biased linkage. The pressure regulator valve permits an increasing pressure to be applied to a slowed or stopped pneumatic motor, approaching the pressure of the pneumatic source to aid in restarting the motor or to provide the additional force necessary to drive a heavily loaded motor. Automatic park and shut-off functions are also provided.

12 Claims, 9 Drawing Figures

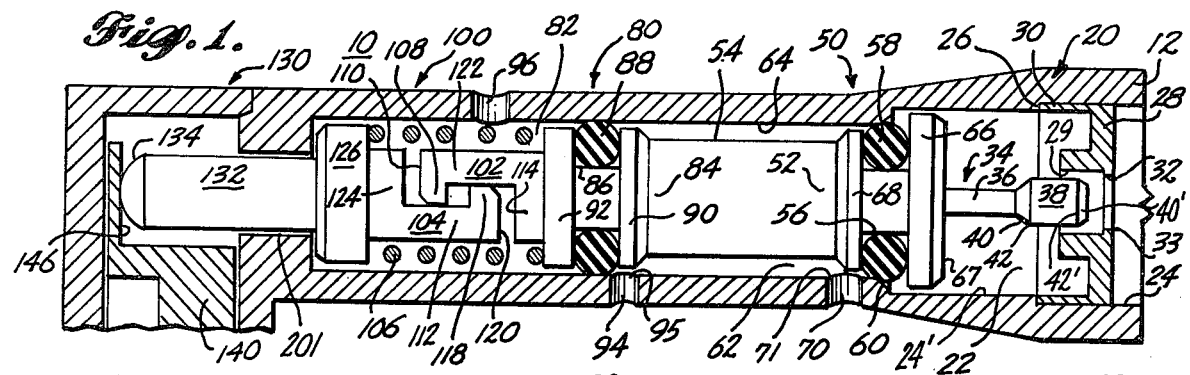
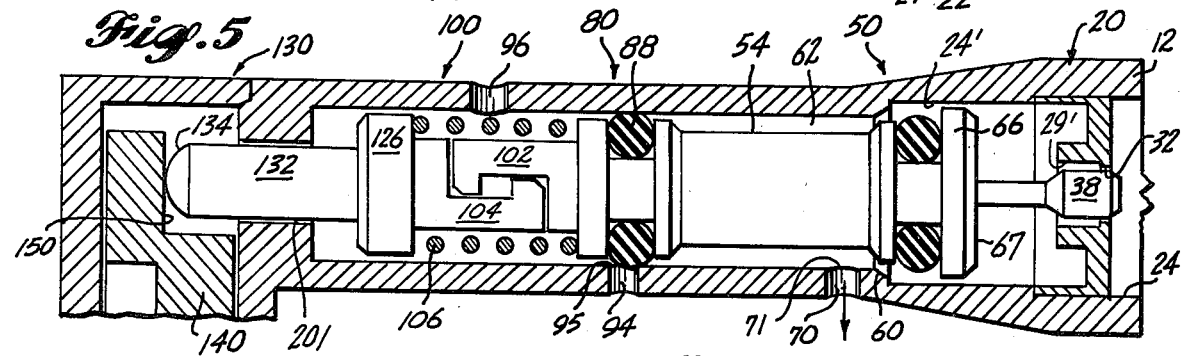
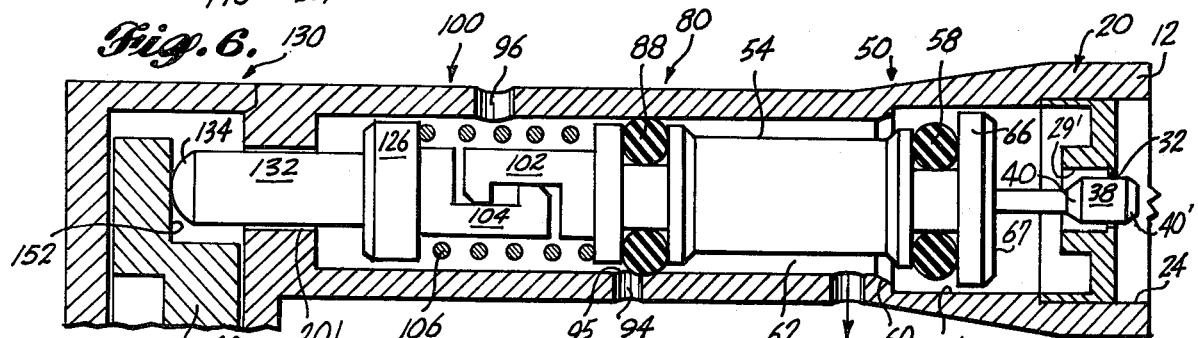
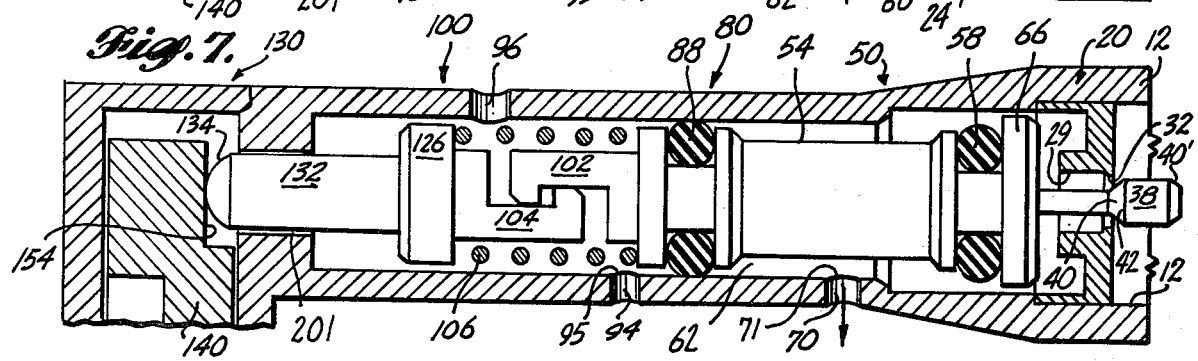
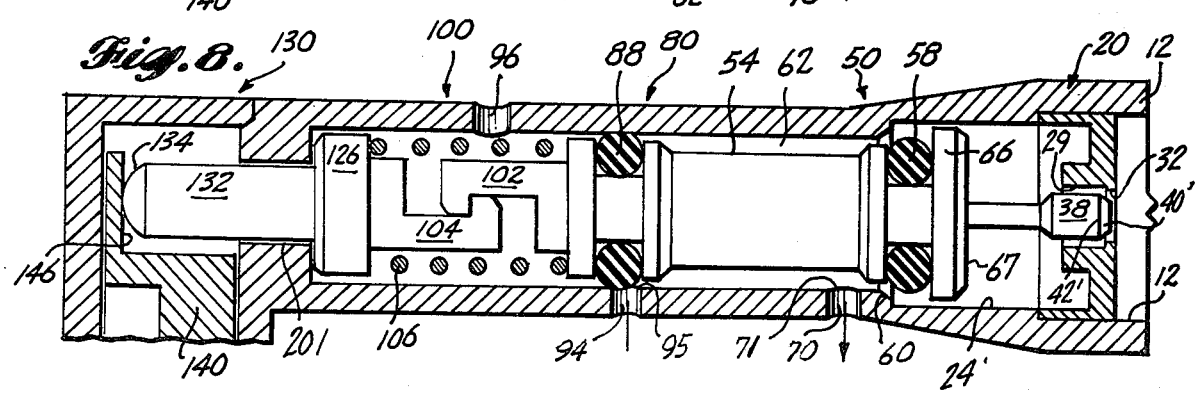

CONTROL VALVE

BACKGROUND OF THE INVENTION

1. Field of the Invention

This invention relates to pneumatic control valves for use with pneumatically driven motors. In particular, this invention relates to a pneumatic control valve for a windshield wiper motor utilizing the combined park valve, run valve and regulator valve assembly.

2. Description of the Prior Art

It can be appreciated that when a control valve and a pneumatically-driven motor such as in U.S. Pat. Nos. 2,678,029 issued to Sprague, et al. and 3,257,910 issued to Gates are first activated, the various moving elements of each, such as O-rings, etc., have increased static frictional forces associated therewith. In order to overcome the increased starting frictional forces, an increased amount of air pressure must be initially provided. In valves of the prior art, this increased air pressure is supplied by an operator manually setting a valve control cam to a higher pressure position. This produces an increased value of regulated air pressure sufficient to overcome the starting static frictional forces and to start the wiper motor. Once the wiper motor achieves a desired operating speed, the operator must manually reset the control cam to a normal operating position. It is desirable that an air-control valve for a windshield wiper motor include a means for automatically providing higher air pressure to overcome initial static frictional forces.

Parking of a wiper motor is not automatically provided by prior art control devices such as shown in U.S. Pat. Nos. 2,616,400 issued to Sprague, et al. and 3,005,455 issued to Riester, et al. Parking of a wiper motor occurs when air pressure is applied to a separate park port of the wiper motor while air pressure is simultaneously applied to the run port of the wiper motor. The wiper motor operates until the wiper blades come to a park position, at which point the wiper motor is stopped. Prior art control devices require that an operator maintain the wiper control in a separate park position until the wipers are locked in the park position. A desirable feature for a wiper control is for the wiper control to provide means for automatically parking the wiper motor when the control is placed in an off position.

Prior art controls for wiper motors have combined a separate air regulator valve and a separate park control valve in one housing. The components and functions of these valves have been independent of each other. For example, one prior art control for a wiper motor has an air pressure regulator valve and a park control valve placed next to each other, but each valve is independently controlled by a separate push pin which rides on a separate cam surface of a rotatable operator control. In addition, this type of valve requires that an operator first manually position the control to the park position. After the wiper motor is parked, the operator is required to manually position the control to an off position. It is desirable that the components of a wiper control be integrally combined to produce a compact unit which automatically increases air pressure and which automatically parks a wiper motor. A similar control device and motor is shown in Gates U.S. Pat. No. 3,257,910.

OBJECTS OF THE INVENTION

It is an object of this invention to provide an improved pneumatic control valve for use with pneumatically-driven motors and other users of controlled pressure pneumatic driving fluids.

It is a further object of the invention to provide an air control valve for use with pneumatically-driven motors which combines, in a single assembly, automatic parking and air pressure regulating functions.

It is another object of the invention to provide an air control valve particularly suited for use with pneumatically-driven windshield wiper motors which provides an automatic parking function when the valve is returned to the off position following operation.

It is another object of the invention to provide an air control valve for use with pneumatically-driven motors which automatically provides for an increasing pneumatic pressure to be applied to a stalled or slowed motor.

It is a further object of the invention to provide a compact, miniaturized air control valve for use with pneumatically-driven windshield wiper motors.

SUMMARY OF THE INVENTION

In accordance with these and other objects of this invention, an improved control valve assembly is provided which delivers fluid from a source of high-pressure fluid to run a fluid-driven motor such as is shown in the Riester U.S. Pat. No. 3,005,445. The motor at a given speed has a predetermined volume rate of flow and a predetermined fluid pressure for operation. Controlled leakage past a pressure regulator valve is provided so that when the rate of fluid flow to the motor drops due to a slowing or stopping of the fluid-driven motor, the pressure of fluid delivered to the fluid-driven motor rises toward the pressure of the fluid source. According to one aspect of the invention, an air control valve assembly provides both a run and an automatic park mode of operation for a fluid-driven motor such as a windshield wiper motor. The control valve assembly includes a pressure regulator valve, a two-way run valve, and a three-way park valve. The pressure regulator has a movable regulator element and an orificed plug sized to provide controlled air leakage when the elements are assembled and upon opening of the valve permits relatively unimpeded fluid flow through the valve. The movable elements of all three valves are connected coaxially and move axially in concert and with respect to each other to various positions providing the different modes of operation for the fluid-driven motor. In the off mode, the run valve is closed, and the park valve is open and is in pneumatic communication with the run valve. In the run mode, the run valve is opened and the regulated air pressure is delivered to the run conduit of the wiper motor. The park valve is closed and vented to the atmosphere. When the rate of air flow is less than a predetermined volume rate of air flow, the valve structure permits leakage of air through the regulator valve to automatically increase the air pressure delivered to the motor. In the automatic park mode the run valve remains open to pneumatic pressure and the park valve is opened to the pneumatic pressure. The park valve thus directs air to automatically park the motor. After the wiper motor is parked, controlled leakage increases the pressure in the valve chamber to the pneumatic source pressure and automatically closes the run valve with pneumatic pressure still applied to both the run port and park port of the motor. The control valve of this invention may be connected to a windshield cleaner motor such as that shown in the Riester U.S. Pat. No. 3,005,445 by connecting the park port of the valve to the parking valve of Riester and the run port of the valve to the inlet of the piston responsive valve mechanism.

BRIEF DESCRIPTION OF THE DRAWINGS

FIG. 1 is an enlarged partially-sectional view of an air control valve and cam mechanism showing the valve in an off position.

FIG. 5 shows the valve in a first, initially activated position.

FIG. 6 shows the valve in the first phase of the low-range operating position.

FIG. 7 shows the valve in the first phase of the mid-range operating position.

FIG. 8 shows the valve in the first phase of the park position.

DESCRIPTION OF THE PREFERRED EMBODIMENT

Figure 2:
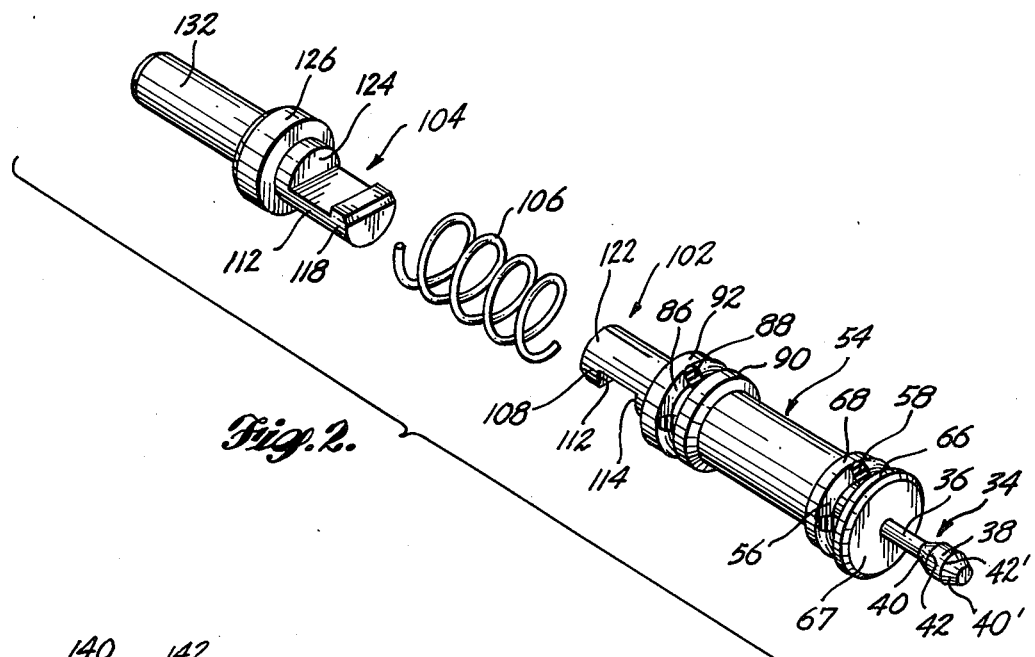
FIG. 2 is an enlarged, exploded perspective view of some of the movable valve components removed from the valve housing.

FIG. 1 shows the essential structural elements of an air control valve assembly 10. FIG. 2 shows the movable components of the air control valve in an exploded, perspective view. As will be described below, FIGS. 5, 6, 7, 8 and 9 show the positions of the movable components in the housing 12 for several different modes of the air control valve assembly 10.

A pressure regulator valve, generally designated 20, is shown in FIG. 1 having a regulator valve chamber 22 formed by a bore 24 located at one end of the housing 12. A reduction in the diameter of the valve chamber 22 produces a step 26 in the interior wall of the valve chamber 22 to the inner bore 24'. A regulator valve plug 28 having a generally cylindrical configuration is press-fit into the chamber 22 so that the end of a longitudinally extending flange portion 30 of the plug 28 may abut the step 26 if inserted the maximum distance into the valve body. To obtain the proper valve operation, plug 28 is pressed into chamber 22 only far enough to provide the desired valve characteristics. The plug 28 has a central bore provided therein which forms a regulator valve orifice 32 having an external edge 33 formed between the bore and the external face of the plug. The central bore in plug 28 also has a counterbore 29 slightly larger in diameter than orifice 32, forming an internal edge therebetween. An axially movable regulator valve pin assembly 34 has an elongated shank portion 36 at the end of which is located a cylindrical regulator valve pin 38 with chamfered surfaces 40 and 40'. The diameter of the valve pin 38 permits axial insertion within the valve orifice 32. A first chamfer 40 on the regulator valve pin 38 is located between the shank portion 36 and a first edge 42. A second chamfer 40' is located on the valve pin 38 between the distal end of the valve pin 38 and a second edge 42'. When high pressure air, for example, at 100 p.s.i. from a source (not shown) is provided at the inlet of the regulator valve 20, the inlet being defined by the outermost portions of the bore 24, the pressurized air flows through the annular zone between valve pin 38 and valve orifice 32 providing a controlled leakage past the regulator valve. Axial movement of pin 38 in the different operational modes of the control valve, as shown in FIGS. 1 and 5-8, results in variable cross-sectional area for fluid flow through the regulator assembly 20.

As shown in FIGS. 1, 2 and 5-8, a run valve 50 has a valve means therein to regulate flow of pneumatic fluid to the run port 70 which may in turn be connected to the inlet port of for example a windshield wiper motor. Spool end 52 of the spool 54 has an external circumferential groove 56 formed therein for receiving and containing O-ring 58. The O-ring 58 cooperates with a valve seat 60 to provide a closable valve means between the regulator chamber 22 and a run valve chamber 62. The run valve chamber 62 is generally defined by bore 64 formed in the central interior portion of the housing 12 and the sealing engagement of the O-rings 58 and 88 with the valve seat 60 and bore 64 respectively, as shown in FIG. 1. Spool 54, positioned within bore 64, carries O-rings 58 and 88 positioned at the ends thereof and is adapted for axial movement within bore 64. Spool end 52 of the spool 54 has a first shoulder 66 and a second shoulder 68 which fit loosely within the bores 24' and 64 respectively and serve as guide means for the spool end 52 within the run valve chamber 62. Because of the loose fit of the shoulders 66 and 68 and the constricted central portion of the spool 54, air may flow in the space between the spool shoulders 66 and 68 and the bore 64 and into the run valve chamber 62. A run valve outlet port 70 is provided by an aperture 71 in the housing 12. The shank 36 of the pressure regulator valve 20 is connected to the spool 54 at shoulder 66 and extends the regulator valve pin 38 axially through chamber 22 into its position within bores 29 and 32 of plug 28.

Figure 9:
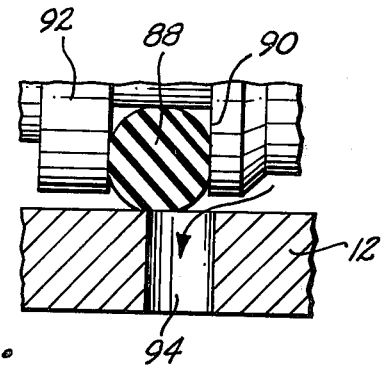
FIG. 9 is an enlarged view showing the relationship of the O-ring 88 to the park port 94, in the first phase of the park position.
Figure 4:
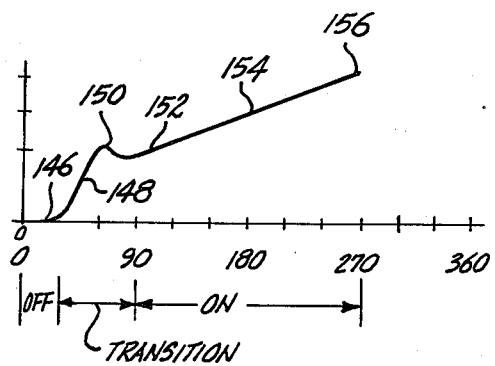
FIG. 4 is a graph showing the displacement of a cam pin as a function of cam rotation.

A park valve 80 regulates air to the park port 94 through an aperture 95 in valve housing 12. The spool end 84 of the spool 54 has a circumferential groove 86 defined by a third spool shoulder 90 and a fourth shoulder 92. Shoulders 90 and 92 serve to guide the spool end 84 within the run valve chamber 64. An O-ring 88 contained in circumferential groove 86 provides sealing engagement of spool 54 with the valve bore 64 and cooperates with aperture 95 as shown in FIG. 9, to provide a closable valve means between the run valve chamber 62 and the park port 94. A park valve chamber 82, vented to the atmosphere, is defined by valve bore 64 and a sealing engagement of O-ring 88 with valve bore 64 on the side of O-ring 88 opposite run valve chamber 62. Park valve chamber 82 is vented to the atmosphere through vent aperture 96.

A cam pin and valve linkage 100 links an operator controlled cam 140 and a cam follower pin 132 with regulator valve 20, run valve 50 and park valve 80. The linkage 100 is composed of the first and second interengaging hooks 102 and 104, respectively, and a spring 106. The first of said hooks, 102, has a base portion 114 fixed to the fourth shoulder 92 and extension 122 fixed to said base 114 and extending in a direction parallel to the axis of the valve housing 12 and a nose portion 108 fixed to the extension 122 in a direction perpendicular to the housing 12. A cam pin shoulder 126 fixed to the cam pin 132 supports the second of said hooks 104. The base of said second hook 124 has an extension 112 parallel to the axis of the housing 12 and a nose portion 118 perpendicular to the axis of the housing 12. The nose portion 118 of the second hook 104 abuts the extension of the first hook 122 and the nose portion 108 of the first hook 102 abuts the extension 112 of the second hook 104. The cam pin shoulder 126 and the fourth shoulder 92 compress a spring 106 which urges the shoulders 126 and 92 apart and the hooks 102 and 104 toward engagement. The linkage 100 is capable of sliding axially within the bore 64 of the housing 12 and depending upon the relative forces applied at each end, one by rotation of the cam 140 and the other by the imposition of pneumatic forces, primarily against face 67, can be collapsed to varying degrees to provide the pressure regulation described in detail below.

Figure 3:
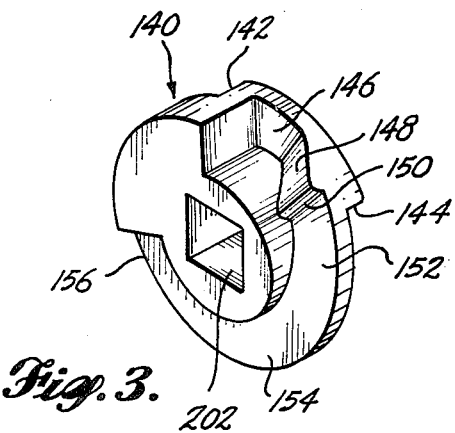
FIG. 3 is an enlarged perspective view of a cam for operating the air control valve.

FIG. 3 shows the features of the surfaces of cam 140. On the back side of cam 140 are surfaces 142 and 144 which serve as stops, limiting rotation of the cam to about 270°. When the cam is rotated so that these surfaces 142,144 abut corresponding projecting portions of housing 130, further rotation of the cam is prevented. The surfaces of cam 140 which are contacted by cam follower pin 132 are shown in FIG. 1. Engagement of cam follower pin 132 with cam surface 146 positions the valve in an off position, pin 132 being urged against cam surface 146 by pneumatic forces against spool surface 67. Engagement with surface 148 moves the valve to a transition between an off and an on position. Engagement with surface 150, the peak of the transition region of the cam, moves the valve to an initially activated position. Engagement with surface 152 moves the valve to a position providing minimum regulated pressure by the valve. Engagement with surface 154 moves the valve to a position of an intermediate value of regulated pressure from the valve. Engagement with surface 156 moves the valve to a position providing maximum regulated pressure by the valve assembly. Note that the local peak on the cam surface in the vicinity of surface 150 serves as a detent preventing the cam follower 132 from inadvertently rotating the cam by slipping down the steep cam surface 148.

As hereinbelow described, the resilient bias given by spring 106 to the linkage 100 and air pressure within regulating valve chamber 22 coact with the position of cam pin 132 to produce the desired air flow.

FIGS. 1, 5, 6, 7 and 8 show the pneumatic control valve in its various operational modes.

FIG. 1 shows the control valve in the off position. In this position there is no air flowing to either park or run ports of the windshield wiper motor. Cam pin 132 abuts face 146 of cam 140, as shown in FIG. 3, and pin 132 is as fully extended from the bore 201 in the housing 12 as the face 146 will permit. In this position, cam pin 132 provides no axial impetus to the linkage 100. The hooks 102 and 104 of linkage 100 are slidably interengaged with the respective noses 108 and 118 of the hooks 102 and 104 abutting the extensions 112 and 122. The pressure source supplies pressurized air to the bore 24, around the edge 33, through the valve orifice 32 and between the chamfer 40' and the counterbore 29 to pressurize the regulator chamber 22. At this off position, the regulator chamber 22 is pressurized to the capacity of the pressure source. The pressure in chamber 22 acts against face 67 to compress spring 106 and press O-ring 58 upon its seat 60.

FIG. 5 shows the position of the valve components immediately subsequent to an initial activation from the off position by an operator. Cam 140 is rotated from the off position corresponding to cam surface 146 to the peak 150 so that the pin 132 passes over the transition surface 148 to engage the peak 150 of the cam 140. FIG. 5 shows the position of the movable valve components when the cam pin 132 first engages the peak 150 of the cam 140. The linkage 100 is shown compressed with the nose portions 108 and 118 abutting the respective bases 124 and 114. The axial impetus provided by the transition face 148 of the cam 140 as it is translated in movement through the cam pin 132, the cam shoulder 126, the second hook 104, the base 114 and thence to the park, run and regulator valves 80, 50 and 20 respectively, unseats O-ring 58 from its seat 60, thereby permitting flow of pressurized fluid into run valve chamber 62.

When O-ring 58 unseats from its seat 60, as shown in FIG. 5, the small quantity of pneumatic fluid at full source pressure previously stored in the regulator chamber 22 is admitted to run valve chamber 62 and then to run port 70. Initially, the linkage 100 will be compressed as shown in FIG. 5 because the static frictional forces in the valve and the pneuamtic forces acting against face 67 of spool 54 will be greater than the force required to compress the spring 106. As the pneumatic pressure in chamber 22 quickly diminishes, spring 106 will overcome the pneumatic force against face 67 and extend linkage 100 fully to open the regulator valve, thereby increasing fluid flow through the valve.

As the valve components move axially, O-ring 88 passes over aperture 95 to close the park port and vent it to the atmosphere through vent 96. Once the run valve 50 is opened and the park port 94 is closed to source pressure and vented to atmosphere, the pressure in chamber 22, chamber 62 and consequently the pressure applied to run port 70 will rise towards source pressure until it is sufficient to overcome static friction in the motor and begin its operation.

As soon as cam 140 is turned to a position at which follower pin 132 is off peak 150, the regulator pin 38 moves back into the valve orifice 32, restricting full flow from the pressure source. This diminished flow from the pressure source is adequate for low speed motor operation because the pneumatic wiper motor requires less air pressure for operation at a low speed than for the initial activation of the motor from a parked position.

FIG. 6 shows the relationship of the valve components in this initial phase of the low range operating position for the pneumatic motor. To obtain this position the operator turns the control shaft keyed to cam 140 so that cam follower pin 132 passes to surface 152 of the cam 140. Pin 38 is positioned within orifice 32, and flow through orifice 32 and around pin 38 is diminished while the flow through the run port 70 is restricted only by the demands of the motor, so that the pressure in chamber 22 decreases. The relatively lower pressure in chamber 22 acting against face 67 then allows spring 106 to extend and move the valve spool 54 axially toward valve orifice 32. The regulator pin 38 thus moves within orifice 32, the chamfer 40 cooperating with orifice edge 33 to provide a variable flow cross section to regulate the output of the valve. As shown in FIG. 6, O-ring 88 prevents fluid flow from chamber 62 to park port 94 and park port 94 remains closed and vented through aperture 96 to the atmosphere. High peak 150 in the cam 140 also serves as a detent to prevent the cam pin 132 from rotating cam 140 and thereby slipping into the park position abutting cam surface 146.

FIG. 7 shows the valve components in the initial phase of a mid-range operating speed for the pneumatic motor. This position is obtained when the operator moves the control shaft keyed to the cam 140 so that the surface 154 of the cam 140 is engaged with the cam follower pin 132. As shown in FIG. 7, the cam follower pin 132 is moved in an axial direction toward the regulator valve plug 28. The other movable valve components including the valve spool 54, its O-rings 58 and 88 and valve pin 38 are in turn moved axially toward the valve orifice 32. The regulator pin 38 has moved as shown so that the chamfer 40 of the regulator pin 38 lies only partially within the valve orifice 32. Axial movement of pin 38 varies the cross-sectional area defined by chamfer 40 and orifice edge 33 to vary the flow of air through the valve. Air will continue to flow through chamber 22, chamber 62 and into port 70. O-ring 88 maintains its sealing engagement with the interior walls of the valve body 12 and the park port 94 remains in communication with the venting port 96. Further rotation of cam 130 so that cam follower pin 132 engages surface 154 of the cam will further extend regulator pin 38 out of the orifice 32 so that more air may flow, subject to regulation by pneumatic forces on surface 67 urging contraction of spring 106.

FIG. 8 shows the position of the movable components of the valve assembly during the initial phase of parking the wiper motor. To obtain this position the operator rotates the control shaft and cam 140 until the cam pin 132 following cam 140 engages the cam surface 146. The initial phase of the park position is shown in FIG. 8. The pressure in chamber 62 and then in chamber 22 will achieve a moderate equilibrium pressure determined by the inlet restriction formed by the counterbore 29 and pin diameter 38, and the demand of the pneumatic motor. The pneumatic pressure against surface 67 may be such that spring 106 is then able to force hooks 102 and 104 apart into the position shown in FIG. 8. The noses 108 and 118 of the respective hooks 102 and 104 abut limiting travel of the valve components. The pressure applied to the open park port 94 and then to the motor soon stops the movement of the motor and the pressure in chambers 22 and 62 begins to build since air no longer flows out of ports 70 and 94 and air continues to slowly flow into chamber 22 by controlled leakage of air past valve pin 38. As soon as the pressure in chamber 22 reaches the level at which pneumatic pressure against surface 67 provides the force needed to compress spring 106, valve spool 54 moves axially to close O-ring 58 against its seat 60, to the position of the valve components shown in FIG. 1. When valve pin 38 is retracted to the position shown in FIG. 1, it is positioned in counterbore 29 which is slightly larger in diameter than orifice 32. The additional flow cross section thus provided permits sufficient pressure and flow to be applied to the motor to activate its valve mechanisms and drive it to its park position.

While the inventors have described their invention in terms of preferred embodiments, it is clear that one of ordinary skill in the art may make changes within the scope and spirit of this invention.

I claim:

1. A valve for controlling the pressure and volume rate of flow of a fluid delivered to a utilization device comprising:
   a valve housing having inlet means for receiving fluid at an elevated pressure, a first outlet means axially spaced from said inlet means for providing fluid at a regulated pressure and rate of flow to the utilization device, a second outlet means axially spaced from said first outlet means for providing fluid pressure to a control means for said utilization device, vent means axially spaced from said second outlet means for selectively venting fluid from said second outlet means, and a regulator valve chamber;
   an axially movable valve spool contained in said valve housing have a metering means positioned adjacent said inlet means and adapted to regulate the pressure and flow rate of fluid entering the regulator valve chamber in response to axial movement of said spool;
   first valve means positioned on said spool between said regulator valve chamber and said first outlet, said first valve means operable by axial movement of said valve spool to open and close a fluid flow path between said inlet means and said first and second outlet means,
   second valve means positioned on said spool adjacent said second outlet means and slidably engaging said housing to selectively connect said second outlet means to said regulator valve chamber or to said vent; and
   means to bias said movable valve member against fluid forces in said regulator valve chamber to provide a regulating function for said metering means said second valve means isolating said second outlet from said vent means when said first valve means is closed, and said second valve means connecting said second outlet to said vent means after said first valve means has moved a defined increment between a fully closed position and a fully opened position.

2. The valve of claim 1 including an actuator mounted within the housing and having a plurality of positions axially biasing said movable valve member, and wherein the bias means includes a resilient biased collapsable coupling means located between the actuator and the movable valve spool such that the actuator positioned in an open position opens the first valve means and biases the movable valve spool against axially directed pneumatic forces to provide a regulating function for said metering means.

3. The apparatus of claim 2 wherein the resilient coupling means includes a linkage resiliently extendable over a limited distance, whereby said metering means adjustably regulates flow and pressure of fluid into said regulator valve chamber.

4. The apparatus of claim 3 wherein the linkage includes a pair of slidable L-shaped interengaged links surrounded by a spring, said spring applying a predetermined axial extension force upon said interengaged links.

5. The apparatus of claim 2 including a cam for engagement with said actuator, the cam with said actuator as a cam follower providing operative settings for said valve.

6. The apparatus of claim 1 wherein the metering means includes a tapered regulator valve pin movable within a bore in said housing to provide a variable area for flow of said fluid.

7. The apparatus of claim 6 wherein clearance of pin to bore is sized to provide predetermined leakage past said metering means.

8. The apparatus of claim 7 wherein said clearance includes different values at different axial positions of the pin such that varying amounts of predetermined leakage are obtained depending upon pin position.

9. The apparatus of claim 1 wherein the first valve means includes an O-ring on said valve spool cooperating with a valve seat on said housing.

10. The apparatus of claim 1 wherein said metering means comprises an orifice having a regulator valve pin axially movable therein, said metering means permitting a predetermined leakage of fluid therethrough when said metering pin is fully within said orifice and providing a variable cross sectional flow area when said pin is withdrawn from or protrudes through said orifice.

11. The apparatus of claim 10 wherein said regulator valve pin is cylindrical with chamfered surfaces at each end thereof to cooperate with said orifice to provide a variable fluid flow cross sectional area depending upon the axial location of said pin within said orifice.

12. The apparatus of claim 10 where said orifice has a counterbore therein to provide additional flow cross sectional area when said pin is positioned therein.

* * * * *